(12) United States Patent
Zhang

(10) Patent No.: US 10,520,749 B2
(45) Date of Patent: Dec. 31, 2019

(54) EYEGLASSES HAVING NEGATIVE IONS AND PROTECTION/FILTER LAYERS

(71) Applicant: K-link Optical Technology (Guangzhou) Co., Ltd., Guangzhou (CN)

(72) Inventor: Zhan Jun Zhang, Guangzhou (CN)

(73) Assignee: K-link Optical Technology (Guangzhou) Co., Ltd., Furong Shiling Town, Huadu Dist., Guangzhou (CN)

( * ) Notice: Subject to any disclaimer, the term of this patent is extended or adjusted under 35 U.S.C. 154(b) by 126 days.

(21) Appl. No.: 15/936,450

(22) Filed: Mar. 27, 2018

(65) Prior Publication Data

US 2019/0302475 A1 Oct. 3, 2019

(51) Int. Cl.
*G02C 5/00* (2006.01)
*G02C 7/10* (2006.01)
*G02B 1/18* (2015.01)
*G02B 1/04* (2006.01)

(52) U.S. Cl.
CPC ............. *G02C 5/001* (2013.01); *G02B 1/041* (2013.01); *G02B 1/18* (2015.01); *G02C 7/10* (2013.01)

(58) Field of Classification Search
CPC . G02C 7/104; G02C 7/10; G02C 7/12; G02C 7/101; G02C 7/105; G02C 7/16; G02C 11/10; G02C 3/003; G02C 7/02; G02C 2200/02; G02C 7/108; G02C 9/00; G02C 11/12; G02C 2200/08; G02C 5/00; G02C 7/102; G02C 11/00; G02C 7/022; G02C 7/086; G02B 1/04; G02B 1/041; G02B 1/11; G02B 1/115; G02B 5/223; G02B 5/23; G02B 1/10; G02B 5/208; G02B 1/14; G02B 2027/0118; G02B 27/0172; G02B 5/22; G02B 5/28; G02B 5/3083; G02B 1/005; G02B 1/118; G02B 2027/0112; G02B 2027/0138; G02B 2027/014; G02B 2027/0178
See application file for complete search history.

(56) References Cited

U.S. PATENT DOCUMENTS

2015/0355478 A1* 12/2015 Falken .................. G02C 5/001 351/121
2017/0285368 A1* 10/2017 Falken .................. G02C 5/001

* cited by examiner

*Primary Examiner* — William R Alexander
*Assistant Examiner* — Sharrief I Broome

(57) ABSTRACT

Health eyeglasses include a frame front, a pair of lenses mounted at the frame front, and a pair of temples pivotally connected to two opposite sides of the frame front. Each lens includes an optical substrate, which is made from a methacrylic polymer material and provided therein with an anion material. A front surface of the optical substrate is sequentially provided with a layer of UV coating, a layer of blue-light filter, and a layer of anti-fog coating. The frame front and the temples are made from a resin material added with an anion material, and thus can produce negative ions, which are beneficial to human health, so that the eyeglasses can promote the health of a wearer's eyes in addition to the function of optical correction.

4 Claims, 3 Drawing Sheets

EYEGLASSES HAVING NEGATIVE IONS AND PROTECTION/FILTER LAYERS

BACKGROUND OF THE INVENTION

1. Field of the Invention

The present invention relates to health eyeglasses and, more particularly, to eyeglasses that can protect the eyes of a user from harmful rays, wherein a frame front and two temples and two lenses thereof contain negative ions, which are beneficial to eye health.

2. Description of the Prior Art

Due to the rapid development of 3C products in recent years, everyone has a 3C electronic product and is seriously dependent on these electronic products for their work or play. However, these electronic products can emit harmful rays (such as blue light), which is visible light with short wavelengths and high energy. It is prone to scattering in non-homogeneous media to form a blurred image in the eyes. Furthermore, high energy light can cause great damages to the eyes, such as retinal maculopathy, cataract, visual fatigue, dazzling, decreased vision, and other adverse effects. The most common way to treat the decreased vision of eyes is the use of eyeglasses (such as glasses for myopia or presbyopia). General eyeglasses achieve the function of optical correction, but fail to prevent UV light, blue light, and moisture condensation. After a user has worn the eyeglasses for a period of time, eye fatigue and discomfort may result.

SUMMARY OF THE INVENTION

One object of the present invention is to provide health eyeglasses to solve the shortcomings of conventional eyeglasses.

According to one embodiment of the present invention, the health eyeglasses generally comprises a frame front, a pair of lenses mounted at the frame front, and a pair of temples pivotally connected to two opposite sides of the frame front. Each lens includes an optical substrate, which is made from a methacrylic polymer material and provided therein with an anion material. A front surface of the optical substrate is sequentially provided with a layer of UV coating, a layer of blue-light filter, and a layer of anti-fog coating. The frame front and the temples can be made from a resin material added with an anion material.

According to another embodiment of the present invention, the health eyeglasses generally comprises a frame front, a pair of lenses mounted at the frame front, and a pair of temples pivotally connected to two opposite sides of the frame front. Each lens includes an optical substrate, which is made from a methacrylic polymer material. A front surface of the optical substrate is firstly coated with a layer of anion material and then sequentially provided with a layer of UV coating, a layer of blue-light filter, and a layer of anti-fog coating. The frame front and the temples can be made from a resin material added with an anion material.

According to one aspect of the present invention, a method for adding an anion material to a frame front or temples may includes the steps of: grinding anion powder to become superfine, nanometer anion powder; adding the nanometer anion powder to an amount of resin material and blending the resin material and the nanometer anion powder evenly to obtain a mixture; putting the mixture in an oven and adding a separating agent for the mixture and heating the mixture until a fully melted state is reached; putting the melted mixture in a cooling molding apparatus, so that a frame front or temples, containing an anion material, can be formed.

One advantage of the present invention is that the filtering effect of the eyeglasses on UV light and blue light can reach more than 60%. Therefore, the eyeglasses can protect the eyes from damages caused by UV light and blue light, and can reduce discomfort of eyes, such as stabbing pain, dryness and fatigue, reduce the occurrence of cataract and retinal maculopathy. Besides, the frame front, the temples, and the lenses of the eyeglasses can produce negative ions to promote blood circulation and metabolism, relieve eye fatigue, and increase oxygen supply around the eyes, so that eye diseases can be prevented and thus the health of eyes can be achieved.

Other objects, advantages, and novel features of the present invention will become more apparent from the following detailed description when taken in conjunction with the accompanying drawings.

DETAILED DESCRIPTION OF THE PREFERRED EMBODIMENTS

To understand the objects and technical means of the present invention, preferred embodiments are illustrated in the following paragraphs with reference to the accompanying drawings.

Figure 1:
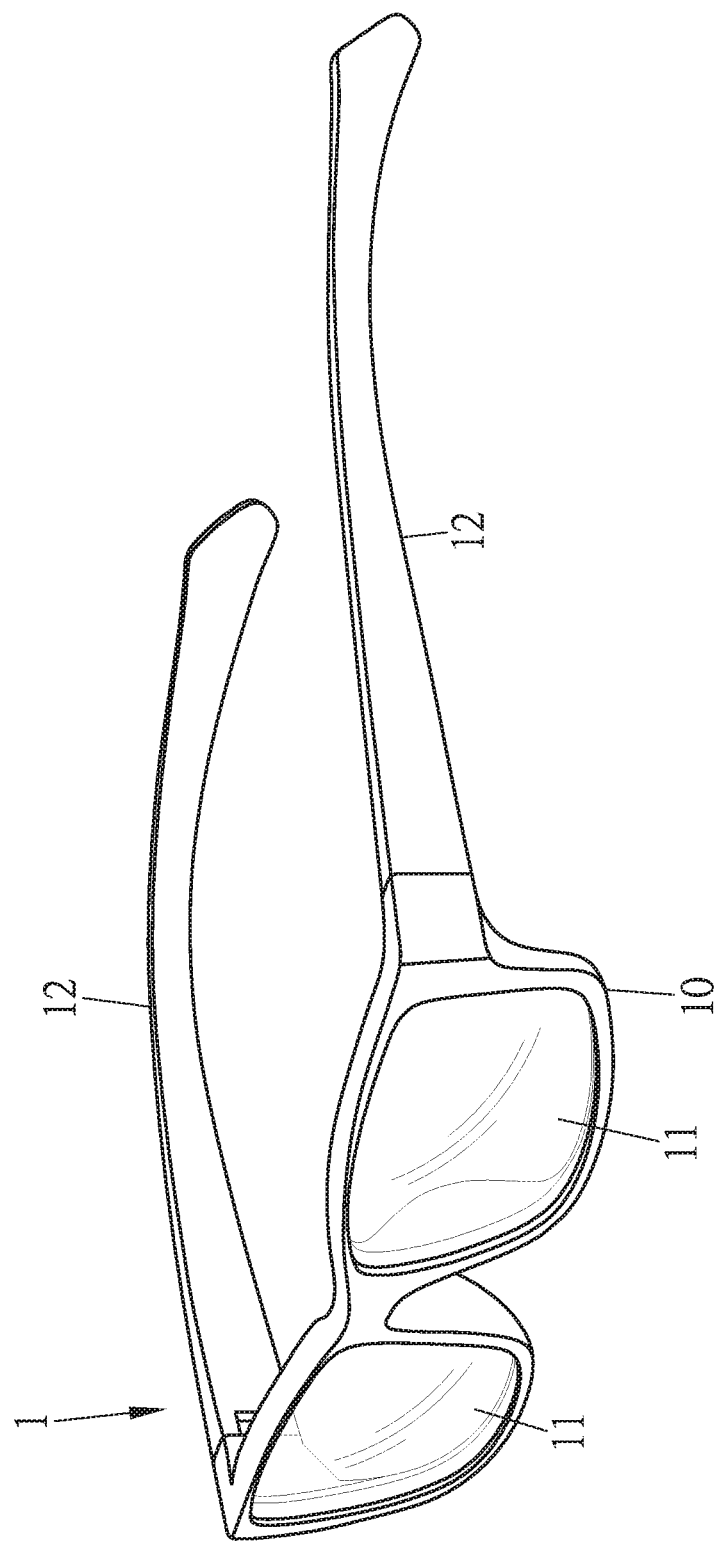
FIG. 1 shows a 3-dimensional view of eyeglasses according one embodiment of the present invention.
Figure 2:
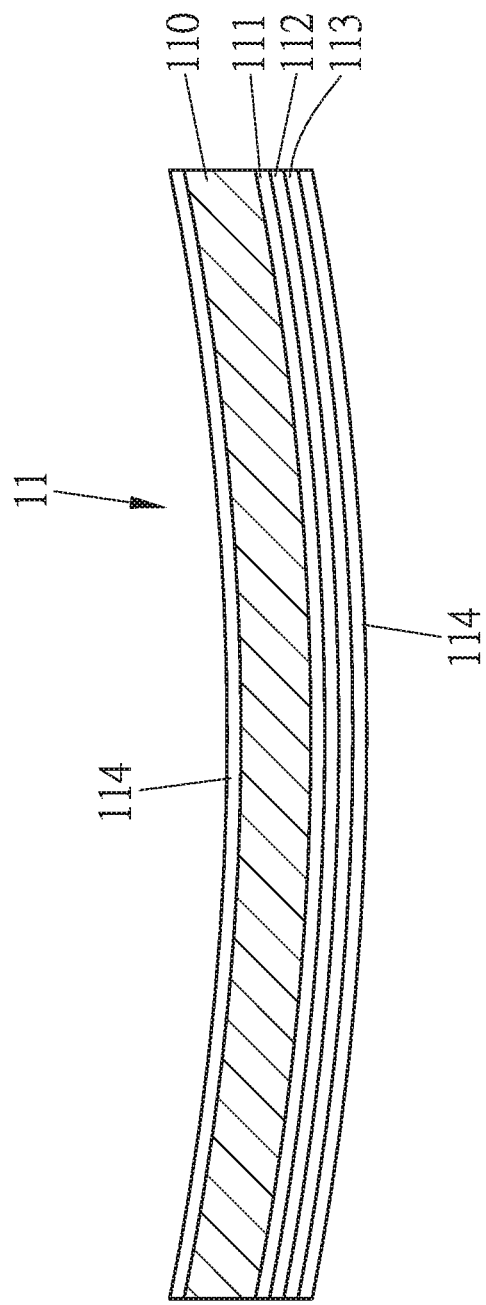
FIG. 2 shows a sectional view of a lens of one embodiment used in the eyeglasses.
Figure 3:
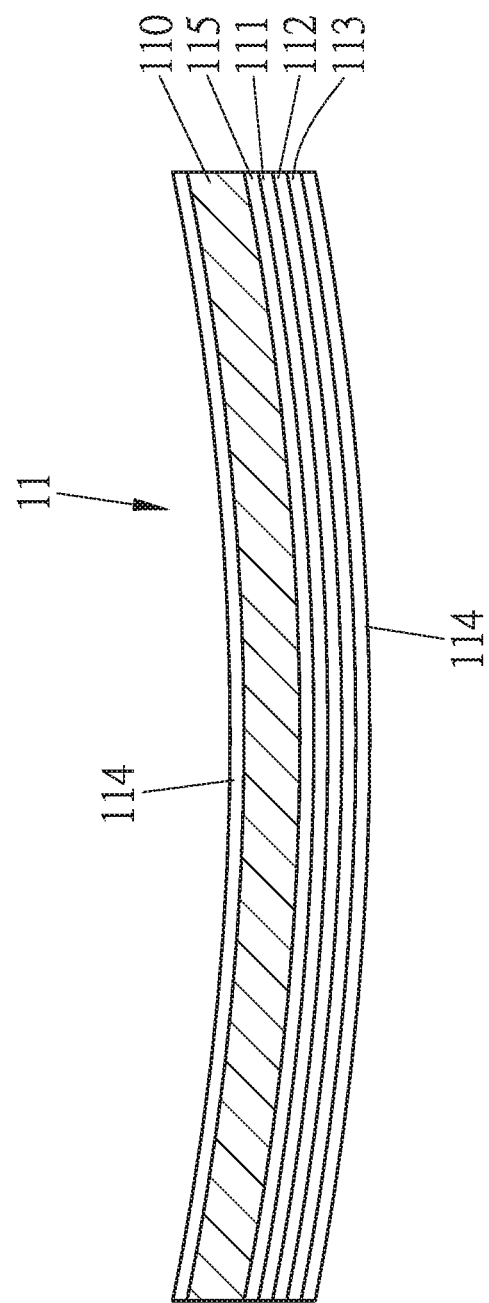
FIG. 3 shows a second view of a lens of another embodiment used in the eyeglasses.

Referring to FIGS. 1, 2 and 3, a pair of health eyeglasses, indicated by reference numeral 1, according to one embodiment of the present invention is shown, which generally comprises a frame front 10, a pair of lenses 11 mounted at the frame front 10, and a pair of temples 12 pivotally connected to two opposite sides of the frame front 10. Each lens 11 includes an optical substrate 110, which can be made from a methacrylic polymer material and is provided therein with an anion material. A front surface (i.e. outer surface) of the optical substrate 110 is sequentially provided with a layer of UV coating 111, a layer of blue-light filter 112, and a layer of anti-fog coating 113. In another embodiment, as shown in FIG. 3, the front surface of an optical substrate 110 is firstly coated with a layer of anion material 115, and then a layer of UV (ultraviolet) coating 111, a layer of blue-light filter 112, and a layer of anti-fog coating 113 are sequentially added to the optical substrate 110. As an example, the blue-light filter 112 may be composed of a first $SiO_2$ film (silicon oxide), a $ZrO_2$ film (zirconium (iii) dioxide), an $In_2O_3$ film (indium (iii) oxide), a $Ti_2O_3$ film (titanium (iii) oxide), and a second $SiO_2$ film (silicon oxide), which can be sequentially added to a lens by vacuum evaporation or sputter deposition. The thickness of each film can be controlled by parameters such as deposition time, evaporation temperature, and electrical power. Furthermore, a rear surface (i.e. inner surface) of the optical substrate 110 and an outer surface of the anti-fog coating layer 113 can be each provided with a layer of anti-reflective coating 114. The frame front 10 and the temples 12 can be made from a resin material added with an anion material, such as nanometer anion powder of tourmaline.

A method for adding an anion material to a frame front or temples may include the steps of: grinding anion powder (i.e. negative ion powder) to become superfine, nanometer anion powder; adding the nanometer anion powder to an amount of resin material and blending the resin material and the nanometer anion powder evenly to obtain a mixture; putting the mixture in an oven and adding a separating agent for the mixture and heating the mixture until a fully melted state is reached; putting the melted mixture in a cooling molding device, so that a frame front or temples, containing an anion material, can be formed.

The anion powder used in the present invention may contain:

$Al_2O_3$ 35.10%, $SiO_2$ 34.81%, $B_2O_3$ 11.02%, $MgO$ 4.70, $Fe_2O_3$ 10.18%, $Na_2O$ 0.91%, $K_2O$ 0.04%, $CaO$ small quantity, $P_2O_5$ 0.22%, $TiO_2$ 0.26%, $FeO$ 1.35%, and other trace elements.

The composition of the anion powder is isomorphous cyclosilicates of aluminum, sodium, iron, germanium or lithium, which is characterized by boron. The thermoelectricity and piezoelectricity allow polar ions to vibrate, thus causing dipole moment and producing electromagnetic radiation in the far-infrared wavelength band. If the anion powder is added to a product (such as fibers) in a certain proportion, the far-infrared radiation can pass free ions, impurity ions and ionic substances. Therefore, impurities and two or three phonons may resonate to produce radiation. Polar vibration of ionic bonds involved in a linkage between organic and inorganic molecules may cause a strong broadband radiation. According to a test, the emissivity of the far-infrared rays from the anion powder is over 90%.

The effect of far-infrared radiation of anion powder on the health of human body and other effects are listed in the following:

1. Far-infrared rays can accelerate the movement of water molecules, and can convert normal water into active water, so that the penetration, diffusion capacity, solubility, and metabolic power of water can be enhanced, and water protective films can be produced.

2. Far-infrared rays can expand the capillaries, enhance blood circulation, promote metabolism, and enhance lymphatic circulation for the circulatory system.

3. Far-infrared rays can activate cells, facilitate removing old dead cells or regenerating cells, increase cell energy, and increase the function and vitality of cells.

The frame 10 and the temple 12 of the present invention contain a lot of tourmaline powder in addition to the polymer anion material. The tourmaline powder can be obtained by removing the impurities from the tourmaline ore and mechanically crushing the tourmaline ore into powder. The powder has a higher amount of negative ions and a higher emissivity of far-infrared radiation. The chemical formula of tourmaline is $NaR_3Al_6Si_6O_{18}BO_{33}(OH,F)_4$, which is a general name for cyclosilicates, a family of trigonal system, wherein R represents a metal cation; when R is $Fe^{2+}$, a black crystal tourmaline can be formed; the far-infrared rays emitted by the tourmaline powder can activate the activity of biomolecules, causing the molecules of an organism to be in a relatively high vibration state, promoting and improving blood circulation, enhancing metabolism, improving immune function, reducing inflammation and swelling, adjusting autonomic nervous system balance, reducing blood pressure, sterilizing, eliminating garbage and harmful substances in blood, increasing red blood cell count, improving allergies, and enhancing immunity.

With the UV coating layer 111, the blue-light filter layer 112, and the anti-fog coating layer 113, each lens 11 of the present invention can effectively reduce the damages of blue-light emitting from either an electronic product or an LED light. The filtering effect of each lens 11 of the present invention on ultraviolet light and blue light can reach more than 60%. Since the frame front 10, the lenses 11, and the temples 12 can produce negative ions (i.e. anions), blood circulation and metabolism around the eyes can be enhanced, and the oxygen supplied to the surrounding of the eyes can be increased; therefore, eye diseases can be prevented and eye fatigue can be relieved. The frame front 10 and the temples 12 can produce negative ions, which are 100 times than an ordinary frame and temples. Due to the frame front 10, the temples 12, and lenses 11 containing anion powder, the eyeglasses 1 can produce a significant amount of negative oxygen ions, which are beneficial to human health. Thus, in addition to the function of optical correction, the eyeglasses 1 can promote the health of a wearer's eyes.

While we have shown and described the embodiments in accordance with the present invention, it should be clear to those skilled in the art that further embodiments may be made without departing from the scope of the present invention.

What is claimed is:

1. Eyeglasses, comprising a frame front, a pair of lenses mounted at the frame front, and a pair of temples pivotally connected to two opposite sides of the frame front, each lens including an optical substrate made from a methacrylic polymer material and provided therein with an anion material, a front surface of the optical substrate being sequentially provided with a layer of UV coating, a layer of blue-light filter, and a layer of anti-fog coating, the frame front and the temples being made from a resin material added with an anion material.

2. Eyeglasses, comprising a frame front, a pair of lenses mounted at the frame front, and a pair of temples pivotally connected to two opposite sides of the frame front, each lens including an optical substrate made from a methacrylic polymer material, a front surface of the optical substrate being firstly coated with a layer of anion material and then being sequentially provided with a layer of UV coating, a layer of blue-light filter, and a layer of anti-fog coating, the frame front and the temples being made from a resin material added with an anion material.

3. The eyeglasses of claim 1, wherein a method for adding an anion material to a frame front or temples includes the steps of: grinding anion powder to become superfine, nanometer anion powder; adding the nanometer anion powder to an amount of resin material and blending the resin material and the nanometer anion powder evenly to obtain a mixture; putting the mixture in an oven and adding a separating agent for the mixture and heating the mixture until a fully melted state is reached; putting the melted mixture in a cooling molding apparatus, so that a frame front or temples, containing an anion material, can be formed.

4. The eyeglasses of claim 2, wherein a method for adding an anion material to a frame front or temples includes the steps of: grinding anion powder to become superfine, nanometer anion powder; adding the nanometer anion powder to an amount of resin material and blending the resin material and the nanometer anion powder evenly to obtain a mixture; putting the mixture in an oven and adding a separating agent for the mixture and heating the mixture until a fully melted state is reached; putting the melted mixture in a cooling molding apparatus, so that a frame front or temples, containing an anion material, can be formed.

* * * * *